US011799127B2

United States Patent
Li et al.

(10) Patent No.: US 11,799,127 B2
(45) Date of Patent: Oct. 24, 2023

(54) ALL SOLID STATE BATTERY HAVING ANODE CURRENT COLLECTOR INCLUDING ELASTIC PORTION AND ALL SOLID STATE BATTERY SYSTEM HAVING THE ANODE CURRENT COLLECTOR

(71) Applicant: TOYOTA JIDOSHA KABUSHIKI KAISHA, Toyota (JP)

(72) Inventors: Ximeng Li, Susono (JP); Masafumi Nose, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 231 days.

(21) Appl. No.: 16/900,152

(22) Filed: Jun. 12, 2020

(65) Prior Publication Data

US 2020/0403270 A1 Dec. 24, 2020

(30) Foreign Application Priority Data

Jun. 24, 2019 (JP) .................................. 2019-116478

(51) Int. Cl.
*H01M 10/0562* (2010.01)
*H01M 4/64* (2006.01)
(Continued)

(52) U.S. Cl.
CPC ....... *H01M 10/0562* (2013.01); *H01M 4/382* (2013.01); *H01M 4/64* (2013.01); *H01M 2004/021* (2013.01)

(58) Field of Classification Search
CPC .... H01M 10/0562; H01M 4/382; H01M 4/64; H01M 2004/021; H01M 4/668;
(Continued)

(56) References Cited

U.S. PATENT DOCUMENTS

2006/0073388 A1 4/2006 Harada et al.
2015/0255827 A1 9/2015 Matsushita et al.
(Continued)

FOREIGN PATENT DOCUMENTS

JP 2006-107812 A 4/2006
JP 2008-311173 A * 12/2008 ............. H01G 11/10
(Continued)

OTHER PUBLICATIONS

Machine translation of WO2014/162532A1, Kimura et al., 2014 (Year: 2014).*
Machine translation of JP 2008-311173A, Kimura Kenji, 2008 (Year: 2008).*

*Primary Examiner* — Kwang Han
(74) *Attorney, Agent, or Firm* — Oliff PLC (57) ABSTRACT

A main object of the present disclosure is to provide an all solid state battery with high coulomb efficiency even when the thickness of an anode active material layer is varied due to charge and discharge. The above object is achieved by providing an all solid state battery comprising: a power generation element including a cathode, a solid electrolyte layer, and an anode, in this order, and an exterior body storing the power generation element, and the anode includes at least an anode current collector, and the anode current collector includes a current collection part, and an elastic part placed on other side of the solid electrolyte layer, with respect to the current collection part.

13 Claims, 3 Drawing Sheets

(51) Int. Cl.
    *H01M 4/38*    (2006.01)
    *H01M 4/02*    (2006.01)
(58) Field of Classification Search
    CPC ........... H01M 10/052; H01M 10/0585; H01M
        50/14; H01M 10/0468; H01M 4/134;
        H01M 4/667; H01M 10/0525; H01M
        2004/027; Y02E 60/10; Y02P 70/50
    See application file for complete search history.

(56) References Cited

U.S. PATENT DOCUMENTS

2016/0036091 A1* 2/2016 Ohtomo ............ H01M 10/0562
                                                    429/304
2019/0393543 A1* 12/2019 Zhamu ................ H01M 50/494

FOREIGN PATENT DOCUMENTS

| JP | 2015-064951 A | 4/2015 | |
|----|---------------|--------|---|
| JP | 2015-167117 A | 9/2015 | |
| JP | 2016-035867 A | 3/2016 | |
| JP | 2019-021384 A | 2/2019 | |
| WO | 2014/141962 A1 | 9/2014 | |
| WO | 2014/162532 A1 | 10/2014 | |
| WO | WO 2014/162532 A1 * | 10/2014 | ........ H01M 10/0562 |

\* cited by examiner

| SUS |
| Li foil |
| Solid electrolyte layer |
| Cu foil |
| Rubber |
| SUS |

FIG. 5B

| SUS |
| Li foil |
| Solid electrolyte layer |
| Cu foil |
| SUS |

FIG. 5C

| SUS |
| Li foil |
| Solid electrolyte layer |
| Rubber |
| SUS |

FIG. 5D

| SUS |
| Li foil |
| Solid electrolyte layer |
| Cu foil |
| SUS |
| Rubber |

FIG. 6

ALL SOLID STATE BATTERY HAVING ANODE CURRENT COLLECTOR INCLUDING ELASTIC PORTION AND ALL SOLID STATE BATTERY SYSTEM HAVING THE ANODE CURRENT COLLECTOR

TECHNICAL FIELD

The present disclosure relates to an all solid state battery and an all solid state battery system.

BACKGROUND ART

An all solid state battery is a battery including a solid electrolyte layer between a cathode active material layer and an anode active material layer, and having an advantage that, compared to a liquid battery having a liquid electrolyte including a flammable organic solvent, it is easier to simplify the safeguard thereof.

Although it is not an all solid state battery technology, Patent Literature 1 discloses a power storage device including a case filled with a liquid electrolyte and an electrode assembly housed in the case wherein an elastically deformable buffer is arranged outside of the electrode assembly. Similarly, although it is not an all solid state battery technology, Patent Literature 2 discloses a battery including a displacement absorbing part having elasticity which is arranged so as to be adjacent to the electrode layers in the stacking direction of a stacked body including stacked single cells containing a current collector layer, an electrode layer, and a separator.

CITATION LIST

Patent Literatures

Patent Literature 1: Japanese Patent Application Laid-Open (JP-A) No. 2015-064951
Patent Literature 2: JP-A No. 2019-021384

SUMMARY OF DISCLOSURE

Technical Problem

The coulomb efficiency is lowered in some cases according to the variation of the thickness of an anode active material layer due to charge and discharge. Specifically, in an all solid state battery, when the thickness of an anode active material layer is decreased upon discharge, an ion conductive path and an electron conductive path are easily interrupted so that the coulomb efficiency is lowered in some cases.

The present disclosure has been made in view of the above circumstances, and a main object of the present disclosure is to provide an all solid state battery with high coulomb efficiency even when the thickness of an anode active material layer is varied due to charge and discharge.

Solution to Problem

In order to achieve the object, the present disclosure provides an all solid state battery comprising: a power generation element including a cathode, a solid electrolyte layer, and an anode, in this order, and an exterior body storing the power generation element, and the anode includes at least an anode current collector, and the anode current collector includes a current collection part, and an elastic part placed on other side of the solid electrolyte layer, with respect to the current collection part.

According to the present disclosure, by using an anode current collector including an elastic part, an all solid state battery with high coulomb efficiency may be obtained, even when the thickness of an anode active material layer is varied due to charge and discharge.

In the disclosure, an anode active material layer may be formed between the current collection part and the solid electrolyte layer.

In the disclosure, the anode active material layer may be a Li metal.

In the disclosure, the current collection part and the solid electrolyte layer may be in direct contact.

In the disclosure, an elastic modulus of the anode current collector may be $2.14 \times 10^3$ N/mm$^2$ or more and $4.08 \times 10^3$ N/mm$^2$ or less.

In the disclosure, the elastic part may have electron conductivity.

In the disclosure, an electron conductivity of the elastic part may be $1 \times 10^{-5}$ S/cm or more.

In the disclosure, a plurality of the power generation elements may be stacked in a thickness direction, and a bipolar structure may be formed.

The present disclosure also provides an all solid state battery system comprising: the above described all solid state battery, and a controlling unit controlling charge and discharge of the all solid state battery.

According to the present disclosure, by using the above described all solid state battery, an all solid state battery system with high coulomb efficiency may be obtained, even when the thickness of an anode active material layer is varied due to charge and discharge.

In the disclosure, the controlling unit may control a thickness increase, due to charge, of an anode active material layer to be 5 µm or more and 50 µm or less.

In the disclosure, when an elastic modulus of the anode current collector is A [N/mm$^2$] and a thickness increase, due to charge, of an anode active material layer is B [mm], a value of A×B may be 200 N/mm or less.

Advantageous Effects of Disclosure

The present disclosure exhibits effects such that the coulomb efficiency of an all solid state battery is high even when the thickness of an anode active material layer is varied due to charge and discharge.

DESCRIPTION OF EMBODIMENTS

The all solid state battery and the all solid state battery system in the present disclosure are hereinafter described in details.

A. All Solid State Battery

Figure 1:
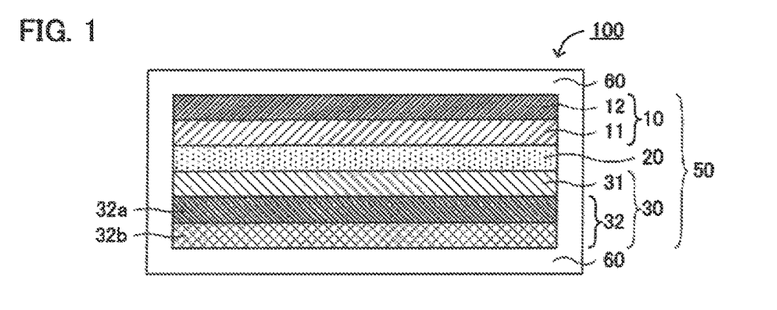
FIG. 1 is a schematic cross-sectional view illustrating an example of the all solid state battery in the present disclosure.

FIG. 1 is a schematic cross-sectional view illustrating an example of the all solid state battery in the present disclosure. All solid state battery 100 shown in FIG. 1 includes power generation element 50 including cathode 10, solid electrolyte layer 20 and anode 30, in this order, and exterior body 60 storing power generation element 50. Cathode 10 includes cathode active material layer 11 and cathode current collector 12, in this order from solid electrolyte layer 20 side. Meanwhile, anode 30 includes anode active material layer 31 and anode current collector 32, in this order from solid electrolyte layer 20 side. Anode current collector 32 includes current collection part 32a, and elastic part 32b placed on other side of solid electrolyte layer 20, with respect to current collection part 32a.

According to the present disclosure, by using an anode current collector including an elastic part, an all solid state battery with high coulomb efficiency may be obtained, even when the thickness of an anode active material layer is varied due to charge and discharge.

As described above, the coulomb efficiency is lowered in some cases according to the variation of the thickness of an anode active material layer due to charge and discharge. When the thickness of the anode active material layer is increased upon charge, a stress is applied to the solid electrolyte layer and the anode current collector, and the electrode reaction occurs under such condition. The stress applied condition may be said to be a condition wherein the solids are favorably in contact with each other, and the ion conductive path and the electron conductive path are easily ensured. In contrast, when the thickness of the anode active material layer is decreased upon discharge, since the stress is relieved, the contact condition between the solids is deteriorated. As the result, the ion conductive path and the electron conductive path are easily interrupted so that the coulomb efficiency is lowered.

In relation to this, the present inventors have focused on the following capability of the anode current collector. Specifically, the present inventors have considered inhibiting the deterioration of the contacting condition between the solids even when the thickness of the anode active material layer is varied due to charge and discharge, by improving the following capability of the anode current collector, to the variation. As the result, an all solid state battery with high coulomb efficiency was obtained by using an anode current collector including an elastic part. According to the present disclosure, as described above, the coulomb efficiency may be improved even when the thickness of the anode active material layer is varied due to charge and discharge, by using the anode current collector including an elastic part. Further, in the present disclosure, since the elastic part is placed on the other side of the solid electrolyte layer, with respect to the current collection part, there is an advantage of preventing the elastic part from being reacted with Li and deteriorated. Also from this point of view, the coulomb efficiency may be improved.

Also, although it is not an all solid state battery technology, Patent Literature 1 discloses a power storage device including a case filled with a liquid electrolyte and an electrode assembly housed in the case wherein an elastically deformable buffer is arranged outside of the electrode assembly. Since Patent Literature 1 presupposes a battery including a liquid electrolyte and the liquid electrolyte has flowability unlike the solid electrolyte, the ion conductive path and the electron conductive path are easily maintained. Therefore, a problem does not occur that the coulomb efficiency is lowered by the variation of the thickness of the anode active material layer due to charge and discharge. In other words, the problem in the present disclosure is a problem peculiar to an all solid state battery.

Also, Patent Literature 2 discloses a battery including a displacement absorbing part having elasticity which is arranged so as to be adjacent to the electrode layers in the stacking direction of a stacked body including stacked single cells containing a current collector layer, an electrode layer, and a separator. Similar to Patent Literature 1, Patent Literature 2 presupposes a battery including a liquid electrolyte so that the ion conductive path and the electron conductive path are easily maintained. Granting that the displacement absorbing part disclosed in Patent Literature 2 is applied to an all solid state battery as it is, there is a problem that the ion conductive path and the electron conductive path are hardly formed due to the displacement absorbing part. In contrast to this, in the present disclosure, there is an advantage that such problem does not occur since the elastic part is placed on other side of the solid electrolyte layer, with respect to the current collection part.

1. Power Generation Element

The power generation element in the present disclosure includes a cathode, a solid electrolyte layer, and an anode, in this order.

(1) Anode

Figure 2A:
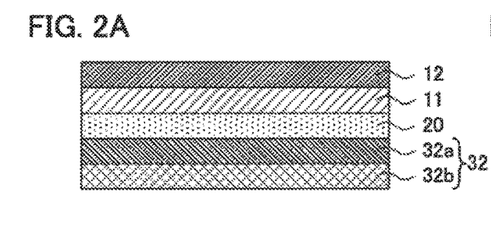
FIG. 2A and FIG. 2B are schematic cross-sectional views illustrating an example of the all solid state battery in the present disclosure.
Figure 2B:
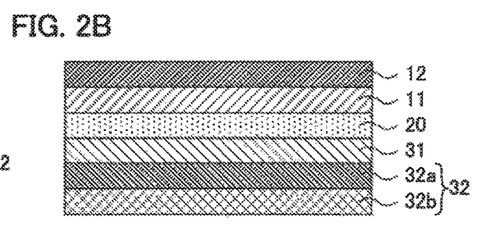

The anode includes at least an anode current collector. The anode may include an anode active material layer, and may not include an anode active material layer. Specific examples of the latter may include a case wherein current collection part 32a in anode current collector 32 is in direct contact with solid electrolyte layer 20, as shown in FIG. 2A. In this case, the anode active material layer is not provided at the fabrication stage of the all solid state battery, and the anode active material layer may be formed by charging. Typically, by charging, Li ions included in cathode active material layer 11 move to the interface of solid electrolyte layer 20 and current collection part 32a via solid electrolyte layer 20. Thereby, as shown in FIG. 2B, anode active material layer (Li metal) 31 is formed between solid electrolyte layer 20 and current collection part 32a. When the anode active material layer is not provided at the fabrication stage (before the initial charge) of the all solid state battery, the variation of the thickness of the anode active material layer due to charge and discharge tends to be large. However, even in such a case, an all solid state battery with high coulomb efficiency may be obtained by using the anode current collector including an elastic part.

Meanwhile, in the present disclosure, an anode active material layer may be provided preliminarily at the fabrication stage of the all solid state battery. In such a case, the all solid state battery includes the anode active material layer between the current collection part and the solid electrolyte layer.

The anode current collector includes a current collection part, and an elastic part placed on other side of the solid electrolyte layer, with respect to the current collection part. The current collection part and the elastic part may be placed so as to be in contact with each other, and may be placed via other layer. In the latter case, it is necessary for the other layer to have thickness and hardness to such an extent that the following capability improving function by the elastic part may be exhibited (to such an extent that the following capability improving function is not totally inhibited).

Also, the elastic modulus of the anode current collector is, for example, $1\times10^2$ N/mm$^2$ or more, may be $5\times10^2$ N/mm$^2$ or more, may be $1\times10^3$ N/mm$^2$ or more, and may be $2.14\times10^3$ N/mm$^2$ or more. Meanwhile, the elastic modulus of the anode current collector is, for example, $5\times10^4$ N/mm$^2$ or less, may be $1\times10^4$ N/mm$^2$ or less, and may be $4.08\times10^3$ N/mm$^2$ or less. The elastic modulus of the anode current collector may be determined by the measurement using a Vickers hardness measuring device. The elastic modulus of the current collection part by itself is not particularly limited, and is, for example, $1\times10^4$ N/mm$^2$ or more. Meanwhile, the elastic modulus of the elastic part itself is preferably less than the elastic modulus of the current collection part itself, and is, for example, $1\times10^2$ N/mm$^2$ or less.

Examples of the material of the current collection part may include a metal material. The metal material may be a simple substance of metal, and may be a metal alloy. Examples of the metal element in the metal material may include Cu, Ni and Fe. The metal alloy preferably includes the metal element as a main component. Also, specific examples of the metal alloy may include SUS including Fe as a main component. Examples of the shape of the current collection part may include a foil shape and a mesh shape.

The thickness of the current collection part is not particularly limited, and is, for example, 1 μm or more, may be 10 μm or more, may be 30 μm or more, may be 50 μm or more, may be 70 μm or more, and may be 100 μm or more. Meanwhile, the thickness of the current collection part is, for example, 500 μm or less, and may be 300 μm or less.

The elastic part is placed on other side of the solid electrolyte layer, with respect to the current collection part. Examples of the material of the elastic part may include polymer material. Examples of the polymer material may include silicone rubber, fluoro-rubber, epichlorohydrin rubber, acrylic rubber, ethylene-acrylic rubber, urethane rubber, nitrile rubber, hydrogenated nitrile rubber, chlorosulfonated polyethylene, chloroprene rubber, EPDM (ethylene-propylene-diene rubber), ethylene rubber, propylene rubber, butyl rubber, butadiene rubber, styrene-butadiene rubber, natural rubber, polyisobutylene, polyethylene chloride, isoprene rubber, foamed polypropylene, foamed polyethylene, and foamed polyurethane. Also, examples of the shape of the elastic part may include a layered shape, and a porous shape.

The elastic part may have electron conductivity, and may not have the electron conductivity. When the elastic part has the electron conductivity, there is an advantage that an all solid state battery having bipolar structure may be easily obtained. Examples of a method for imparting the electron conductivity to the elastic part may include a method wherein an electron conductive material (such as carbon material) is added to the above described polymer material. That is, the elastic part may include the polymer material and the electron conductive material. The electron conductivity of the elastic part at 25° C. is, for example, $1\times10^{-7}$ S/cm or more, may be $1\times10^{-6}$ S/cm or more, and may be $1\times10^{-3}$ S/cm or more. The electron conductivity of the elastic part may be determined by, for example measuring a direct-current resistance.

The thickness of the elastic part is not particularly limited, and is, for example, 10 μm or more, may be 30 μm or more, may be 50 μm or more, may be 70 μm or more, and may be 100 μm or more. Meanwhile, the thickness of the elastic part is, for example, 500 μm or less, and may be 300 μm or less.

The anode active material layer in the present disclosure includes at least an anode active material. The anode active material layer may include the anode active material only, and may further include other material.

Examples of the anode active material may include a metal active material, a carbon active material, and an oxide active material. Examples of the metal active material may include Li, In, Al, Si, Sn and an alloy including at least one kind of these. Examples of the carbon active material may include graphite, hard carbon, and soft carbon. Examples of the oxide active material may include $Nb_2O_5$, $Li_4Ti_5O_{12}$, and SiO.

Meanwhile, examples of the other material may include a solid electrolyte, an electron conductive material, and a binder. These materials may be in the same contents as those described in "(2) Cathode" below. The thickness of the anode active material layer is, for example 0.1 μm or more and 1000 μm or less.

(2) Cathode

The cathode usually includes a cathode active material layer and a cathode current collector, in order from the solid electrolyte layer side. The cathode active material layer is a layer including at least a cathode active material. Also, the cathode active material layer may include at least one of a solid electrolyte, an electron conductive material and a binder, as necessary.

Examples of the cathode active material may include an oxide active material. Examples of the oxide active material may include rock salt bed type active materials such as $LiCoO_2$, $LiMnO_2$, $LiNiO_2$, $LiVO_2$, and $LiNi_{1/3}Co_{1/3}Mn_{1/3}O_2$; spinel type active materials such as $LiMn_2O_4$, $Li_4Ti_5O_{12}$, and $Li(Ni_{0.5}Mn_{1.5})O_4$; and olivine type active materials such as $LiFePO_4$, $LiMnPO_4$, $LiNiPO_4$, and $LiCoPO_4$. A Li ion conductive oxide may be coated on the surface of the cathode active material. Examples of the Li ion conductive oxide may include $LiNbO_3$, $Li_4Ti_5O_{12}$, and $Li_3PO_4$.

The proportion of the cathode active material in the cathode active material layer is, for example, 20% by weight or more, may be 30% by weight or more, and may be 40% by weight or more. Meanwhile, the proportion of the cathode active material is, for example, 80% by weight or less, may be 70% by weight or less, and may be 60% by weight or less.

Examples of the solid electrolyte may include an inorganic solid electrolyte such as a sulfide solid electrolyte, an oxide solid electrolyte, a nitride solid electrolyte, and a halide solid electrolyte. The sulfide solid electrolyte includes at least a S element, and is a compound having ion conductivity. Examples of the sulfide solid electrolyte having lithium ion conductivity may include a solid electrolyte including a Li element, an X element (X is at least one kind of P, As, Sb, Si, Ge, Sn, B, Al, Ga, and In), and a S element. Also, the sulfide solid electrolyte may further include at least either one of an O element and a halogen element. Examples of the halogen element may include a F element, a Cl element, a Br element, and an I element.

The sulfide solid electrolyte may be a glass based sulfide solid electrolyte, may be a glass ceramic based sulfide solid electrolyte, and may be a crystalline sulfide solid electrolyte. Also, the sulfide solid electrolyte may include a crystal phase. Examples of the crystal phase may include a Thio-LISICON type crystal phase, a LGPS type crystal phase, and an argyrodite type crystal phase.

Examples of the shape of the solid electrolyte may include a granular shape. The average particle size ($D_{50}$) of the solid electrolyte is, for example, 0.1 μm or more, and may be 1 μm or more. Meanwhile, the average particle size ($D_{50}$) of the solid electrolyte is, for example, 50 μm or less, and may be 30 μm or less. The average particle size ($D_{50}$) may be determined by, for example, an observation with a scanning electron microscope (SEM). The number of the sample is preferably large, and is, for example, 100 or more. Also, the solid electrolyte is preferably high in ion conductivity. The ion conductivity of the solid electrolyte at 25° C. is, for example, $1 \times 10^{-3}$ S/cm or more, may be $1 \times 10^{-4}$ S/cm or more, and may be $1 \times 10^{-3}$ S/cm or more.

Examples of the electron conductive material may include a carbon material. Examples of the carbon material may include a granular carbon materials such as acetylene black (AB), Ketjen black (KB); and a fibrous carbon materials such as carbon fiber, carbon nanotube (CNT), and carbon nanofiber (CNF). Examples of the binder may include rubber-based binders such as butylene rubber (BR) and styrene butadiene rubber (SBR), and fluorine-based binders such as polyvinylidene fluoride (PVDF).

The thickness of the cathode active material layer is, for example, 0.1 μm or more and 1000 μm or less. Examples of a method for forming the cathode active material layer may include a method wherein a slurry including at least a cathode active material and a dispersant is coated and dried.

Examples of the material for the cathode current collector may include SUS, aluminum, nickel, iron, titanium, and carbon. Examples of the shape of the cathode current collector may include a foil shape and a mesh shape. The thickness of the cathode current collector is not particularly limited.

Also, in the present disclosure, the cathode may include an elastic layer. The elastic layer may be placed between the cathode active material layer and the cathode current collector, and may be placed on other side of the solid electrolyte layer, with respect to the cathode current collector. The elastic layer may be in the same contents as those described as the elastic part in "(1) Anode" above; thus, the description herein is omitted.

(3) Solid Electrolyte Layer

The solid electrolyte layer is a layer formed between the cathode and the anode. The solid electrolyte layer includes at least the solid electrolyte, and may include a binder as needed. The solid electrolyte and the binder may be in the same contents as those described in "(2) Cathode" above; thus, the description herein is omitted. The thickness of the solid electrolyte layer is, for example, 0.1 μm or more and 1000 μm or less. Examples of the method for forming the solid electrolyte layer may include a method wherein the solid electrolyte is compression molded.

2. Exterior Body

The exterior body in the present disclosure is a member that stores the power generation element, and a known member capable of being used as an exterior body for an all solid state battery may be used. The exterior body may have plasticity, and may not have plasticity. Examples of the former may include an aluminum laminate film. Examples of the latter may include a cell case. The cell case preferably has stiffness to such an extent so as not to be easily deformed when a force is applied from outside so that the power generation element may be protected.

Also, the all solid state battery may or may not include a confining jig that applies a confining pressure in the thickness direction, to the power generation element. A known jig capable of being used as a confining jig for an all solid state battery may be used as the confining jig in the present disclosure. Examples of the confining jig may include a confining jig containing plate parts that sandwiches the both surfaces of the power generation element, a bar part that connects the two plate parts, and an adjusting part connected to the bar part, and adjusts the confining pressure by, for example, a screw structure.

The confining pressure is not particularly limited, and is, for example, 0.01 MPa or more, may be 0.1 MPa or more, may be 1 MPa or more, and may be 5 MPa or more. When the confining pressure is too low, each layer included in the power generation element may not be in good contact. Meanwhile, the confining pressure is, for example, 50 MPa or less, and may be 20 MPa or less. When the confining pressure is too high, high stiffness is required to the confining jig so that the confining jig may be increased in size.

The exterior body may be placed between the power generation element and the confining jig, and may be placed so as to embrace the power generation element and the confining jig. Also, the exterior body may also function as a confining jig. In contrast, the exterior body may be a separate member from the confining jig.

3. All Solid State Battery

The all solid state battery in the present disclosure may include only one power generation element, and may include two or more power generation elements. In the latter case, a plurality of the power generation elements are preferably stacked in the thickness direction. The number of the stacked power generation elements is not particularly limited, and is usually 2 or more, may be 5 or more, may be 10 or more, and may be 20 or more. Meanwhile, the number of the stacked power generation elements is, for example, 200 or less.

Figure 3:
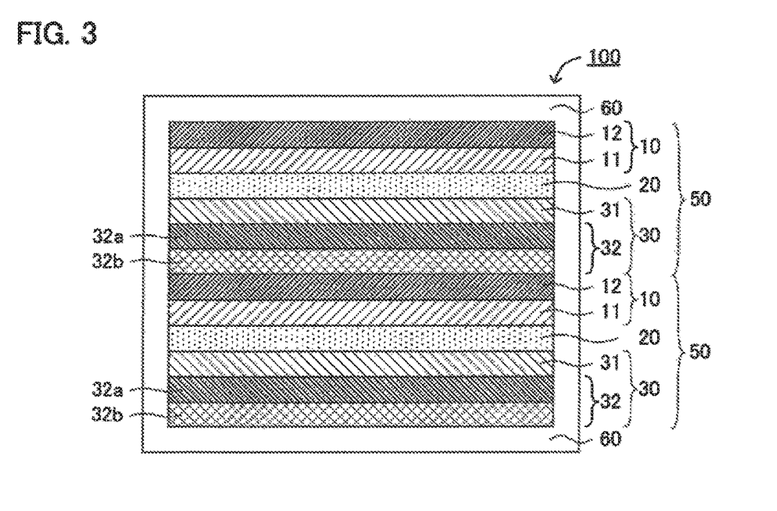
FIG. 3 is a schematic cross-sectional view illustrating an example of the all solid state battery in the present disclosure.

The plurality of the power generation elements stacked in the thickness direction is preferably connected in series. That is, a bipolar structure is preferably formed. By forming the bipolar structure, the voltage may be made higher. In all solid state battery 100 shown in FIG. 3, for example, a plurality of power generation elements 50 are stacked in the thickness direction, and cathode 10 of one power generation element 50 and anode 30 of other power generation element 50 are connected in series. Particularly, when elastic part 32b placed in the middle of the figure has electron conductivity, cathode current collector 12 and current collection part 32a (anode current collector) adjacent to elastic part 32b may be electrically connected. Incidentally, although not particularly shown in the figure, the plurality of the power generation elements stacked in the thickness direction may be connected in parallel. By connecting in parallel, the capacity may be made higher.

The all solid state battery in the present disclosure is preferably an all solid state lithium battery. The all solid state battery may be a primary battery and may be a secondary battery, and the latter is preferable so as to be repeatedly charged and discharged, and be useful as a car-mounted battery, for example.

B. All Solid State Battery System

Figure 4:
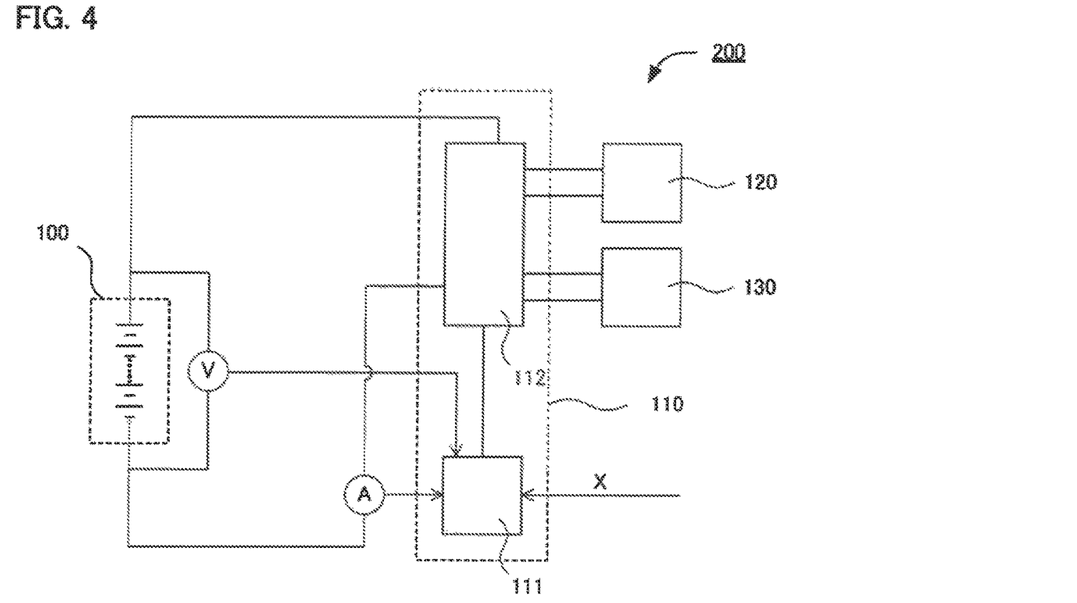
FIG. 4 is a schematic diagram illustrating an example of the all solid state battery system in the present disclosure.

FIG. 4 is a schematic view illustrating an example of the all solid state battery system in the present disclosure. All solid state battery system 200 shown in FIG. 4 includes at least all solid state battery 100 and controlling unit 110 controlling charge and discharge of all solid state battery 100. Controlling unit 110 includes, for example, ECU (Electronic Control Unit) 111 and PCU (Power Control Unit) 112. ECU 111 instructs PCU 112 to charge/discharge (for example, an instruction to start or an instruction to stop) based on command X from outside (for example, charging command or discharging command) and voltage V and current A of all solid state battery 100. Upon discharge, PCU 112 supplies power to load 120, and upon charge, it receives power from power source 130.

According to the present disclosure, by using the above described all solid state battery, an all solid state battery system with high coulomb efficiency may be obtained, even when the thickness of an anode active material layer is varied due to charge and discharge.

1. All Solid State Battery

The all solid state battery in the present disclosure may be in the same contents as those described in "A. All solid state battery" above; thus, the description herein is omitted.

2. Controlling Unit

The controlling unit in the present disclosure has a function of controlling the charge/discharge of the all solid state battery. As shown in FIG. 4, for example, examples of the controlling unit may include controlling unit 110 including ECU (Electronic Control Unit) 111 and PCU (Power Control Unit) 112. ECU preferably includes a microcontroller (MCU). Also, PCU preferably includes a converter and an inverter, and may further include a cooling mechanism.

The controlling unit preferably controls the thickness increase of the anode active material layer, due to charge. Here, the thickness increase of the anode active material layer due to charge is regarded as B. Increase B corresponds to the increased thickness (thickness increase) from a basis of the anode active material layer due to charge, using the condition before the initial charge or after full discharge, wherein SOC (State Of Charge) is 0%, as a basis. Increase B may be determined by, for example, measuring the thickness of the anode active material layer before and after a charge. Also, increase B may be determined from a theoretical capacity, an electrode area, and charging capacity. When the anode active material is Li metal, for example, it may be determined from: Increase B [mm]=(Charging capacity [mAh/cm$^2$]×Electrode area [cm$^2$]×10)/(Li metal theoretical capacity per unit volume [mAh/cm$^3$]×Electrode area [cm$^2$]).

The controlling unit may control increase B so as to be, for example, 0.1 μm or more, may control so as to be 1 μm or more, and may control so as to be 5 μm or more. That is, the controlling unit may control so that a battery is charged until increase B is at a specific value or more. Meanwhile, the controlling unit may control increase B so as to be, for example, 500 μm or less, may control so as to be 300 μm or less, may control so as to be 100 μm or less, and may control so as to be 50 μm or less. That is, the controlling unit may control so that increase B does not exceed a specific value.

Also, the elastic modulus of the anode current collector is regarded as A [N/mm$^2$] and the thickness increase of the anode active material layer due to charge is regarded as B [mm]. The value of A×B is, for example 500 N/mm or less, may be 350 N/mm or less, may be 200 N/mm or less, and may be 180 N/mm or less. Meanwhile, the value of A×B is, for example, 10 N/mm or more, may be 20 N/mm or more, and may be 40 N/mm or more.

The present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

As a current collection part of an anode current collector, a Cu foil (thickness of 10 μm) was prepared, and as an elastic part of the anode current collector, a silicone rubber having electron conductivity (Silius from Fuso Rubber Sangyo Co., Ltd., thickness of 50 μm) was prepared. Also, as a solid electrolyte for forming a solid electrolyte layer, a sulfide solid electrolyte (Li$_2$S—P$_2$S$_5$-based material including LiBr and LiI) was prepared. Further, as a cathode (counter electrode), a Li foil was prepared.

Figure 5A:
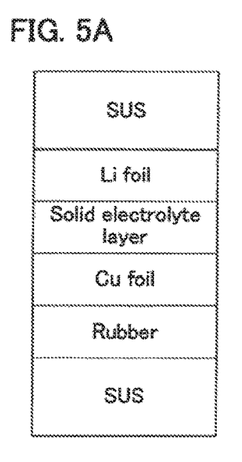
FIGS. 5A to 5D are schematic diagrams explaining evaluation batteries obtained in Examples 1 and 2, Comparative Examples 1 to 3, and Reference Example 1.

After that, 101.7 mg of the sulfide solid electrolyte was press-molded under pressure of 6 ton/cm$^2$ so as to form a solid electrolyte layer. The Li foil was placed on one surface side of the obtained solid electrolyte layer, the Cu foil and the rubber were placed on the other surface side, and the stack was press-molded under pressure of 6 ton/cm$^2$ so as to form a power generation element (area of 1 cm$^2$). The obtained power generation element was confined under 2 N·m to obtain an evaluation battery. As shown in FIG. 5A, the obtained evaluation battery had a stacked structure wherein SUS, Li foil, solid electrolyte layer, Cu foil, rubber and SUS were placed in this order.

Example 2

An evaluation battery was obtained in the same manner as in Example 1, except that a silicone rubber having electron conductivity (Silius from Fuso Rubber Sangyo Co., Ltd., thickness of 100 μm) was used as the elastic part of the anode current collector.

Comparative Example 1

Figure 5B:
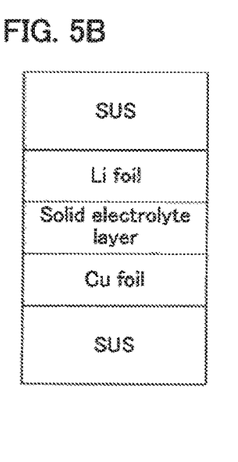

An evaluation battery was obtained in the same manner as in Example 1, except that the elastic part of the anode current collector was not provided. As shown in FIG. 5B, the obtained evaluation battery had a stacked structure wherein SUS, Li foil, solid electrolyte layer, Cu foil and SUS were placed in this order.

Comparative Example 2

Figure 5C:
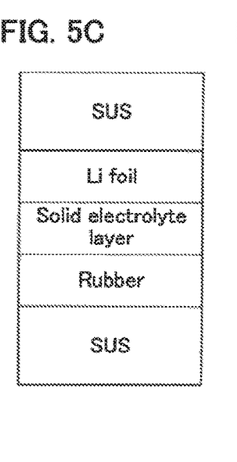

An evaluation battery was obtained in the same manner as in Example 1, except that the current collection part (Cu foil) of the anode current collector was not provided. As shown in FIG. 5C, the obtained evaluation battery had a stacked structure wherein SUS, Li foil, solid electrolyte layer, rubber and SUS were placed in this order.

Comparative Example 3

An evaluation battery was obtained in the same manner as in Comparative Example 2, except that a silicone rubber having electron conductivity (Silius from Fuso Rubber Sangyo Co., Ltd., thickness of 100 μm) was used as the elastic part of the anode current collector.

Reference Example 1

Figure 5D:
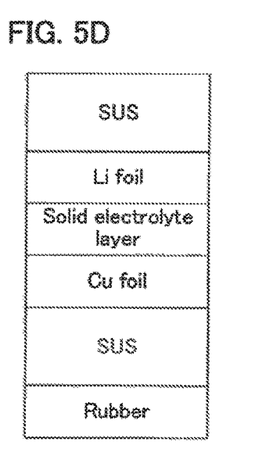

An evaluation battery was obtained in the same manner as in Example 1, except that SUS was placed between the Cu foil and the rubber. As shown in FIG. 5D, the obtained evaluation battery had a stacked structure wherein SUS, Li foil, solid electrolyte layer, Cu foil, SUS and rubber were placed in this order.

[Evaluation]

<Measurement of Elastic Modulus>

The elastic modulus of the anode current collectors used in Examples 1 and 2, Comparative Examples 1 to 3, and Reference Example 1 was measured. For the measurement of the elastic modulus, a Vickers hardness measuring device (measuring device: Dynamic Ultra Micro Hardness Tester from Shimadzu Corp., model number: DUH-211, indenter: diamond triangle pyramid indenter (115°) was used. Specifically, the indenter was pressed onto the anode current collector placed on a test bench, and the load was gradually increased. The pressing was stopped when the load reached 1 gf, the load was maintained as it was for 5 seconds, and the load was relieved. Elastic modulus A (indentation elastic modulus $E_{it}$) was determined from the obtained load/unload curve. Specifically, $E_r$ (reduced elastic modulus) was determined from the slope S of the unload curve, and $E_{it}$ was determined from $E_r$.

$$E_r = \frac{S\pi^{0.5}}{2A_p^{0.5}}$$

$$E_{it} = \frac{1 - v_s^{0.5}}{\frac{1}{E_r} - \frac{1 - v_i^{0.5}}{E_i}}$$

[Formula 1]

In the formula, S is the slope of at beginning of unloading (slope of approximate straight line), $A_p$ is contact projected area, $V_s$ is Poisson ratio of the sample, $V_i$ is Poisson ratio of the indenter, and $E_i$ is Yang's modulus of the indenter. Incidentally, when the anode current collector included the current collection part (Cu foil) and the elastic part (rubber) as in Examples 1 and 2, the elastic part (rubber) side was brought into contact with test bench, and the elastic modulus of the surface of the current collection part (Cu foil) side was measured.

<Charge and Discharge Test>

A charge and discharge test was carried out to the evaluation cells obtained in Examples 1 and 2, Comparative Examples 1 to 3, and Reference Example 1. Specifically, the evaluation cell was placed still in a constant temperature bath at 25° C. for an hour, and the temperature of the evaluation cell was even out. Next, the evaluation cell was charged (Li deposition) at constant current of current density 435 μA/cm², and the charge was stopped when reached to a predetermined charging capacity $C_1$. After 10 minutes, the evaluation cell was discharged (Li dissolution) at constant current of current density 435 μA/cm², and the discharge was terminated when reached to 1.0 V. Discharging capacity $C_2$ was measured upon the termination.

In Example 1, as charging capacity $C_1$, three patterns of 2 mAh/cm² (Example 1-1), 4.35 mAh/cm² (Example 1-2), and 8.7 mAh/cm² (Example 1-3) were set. Similarly, in Comparative Example 1, three patterns were set (Comparative Examples 1-1 to 1-3). Meanwhile, in Example 2, Comparative Examples 2 and 3, and Reference Example 1, 4.35 mAh/cm² was set as charging capacity $C_1$.

Coulomb efficiency Q was determined from the following formula.

Coulomb efficiency $Q[\%] = C_2[\text{mAh/cm}^2]/C_1[\text{mAh/cm}^2] \times 100$ Also, thickness increase B, due to charge, of the anode active material layer was determined from the following formula.

Thickness increase $B$ [mm] = $C_1$[mAh]/206 [mAh/mm]

Incidentally, this formula was obtained by dividing ($C_1$ [mAh/cm²]×1 [cm²] (electrode area)×10) by (3861 [mAh/cm²] (Li metal theoretical capacity)×0.534 [g/cm³] (Li metal density)×1 [cm²] (electrode area)).

TABLE 1

| | Anode current collector | Elastic modulus A [N/mm²] | Increase B [mm] | A × B [N/mm] | Coulomb efficiency Q [%] |
|---|---|---|---|---|---|
| Example 1-1 | Cu foil, rubber (50 μm) | 4.08 × 10³ | 9.7 × 10⁻³ | 39.6 | 99.0 |
| Example 1-2 | | | 21.1 × 10⁻³ | 86.1 | 99.4 |
| Example 1-3 | | | 42.2 × 10⁻³ | 172.1 | 99.6 |
| Example 2 | Cu foil, rubber (100 μm) | 2.14 × 10³ | 21.1 × 10⁻³ | 45.2 | 99.7 |
| Comp. Ex. 1-1 | Cu foil | 5.73 × 10⁴ | 9.7 × 10⁻³ | 555.9 | 98.2 |
| Comp. Ex. 1-2 | | | 21.1 × 10⁻³ | 1209.0 | 98.1 |
| Comp. Ex. 1-3 | | | 42.2 × 10⁻³ | 2418.1 | 97.1 |
| Comp. Ex. 2 | Rubber (50 μm) | 7.14 × 10¹ | 21.1 × 10⁻³ | 1.5 | 83.5 |
| Comp. Ex. 3 | Rubber (100 μm) | 4.30 × 10¹ | 21.1 × 10⁻³ | 0.9 | 50.4 |
| Ref. Ex. 1 | Cu foil, SUS, rubber (50 μm) | 2.48 × 10⁴ | 21.1 × 10⁻³ | 523.3 | 98.3 |

As shown in Table 1, a high coulomb efficiency of 99% or more was obtained in both of Examples 1 and 2. Since the evaluation cells obtained in Examples 1 and 2 had the elastic part, it is presumed that the anode current collector followed the thickness variation of the anode active material layer well, and as the result, a high coulomb efficiency was obtained. Particularly, an extremely high coulomb efficiency such as 99.7% was obtained in Example 2. This reason is presumed that, by making the elastic part (rubber) thicker, the elastic modulus of the anode current collector was further lowered so that the following capability was further improved.

Meanwhile, compared to Example 1, the coulomb efficiency was low in Comparative Example 1. This reason is presumed that, since the evaluation cell obtained in Comparative Example 1 did not have the elastic part, the elastic modulus of the anode current collector was high, not easily deformed. Specifically, it is presumed that, since the anode current collector could not follow the thickness variation of the anode active material layer well, a contact failure occurred between the solid electrolyte layer and Li metal (anode active material layer) so that a part of Li metal was not dissolved.

Also, compared to Example 1, the coulomb efficiency was drastically low in Comparative Examples 2 and 3. The reasons is presumed that the electron conductivity of the elastic part (rubber) was low and the resistance was high, compared to the current collection part (Cu foil), and the elastic part (rubber) reacted with Li so that Li was consumed.

Figure 6:
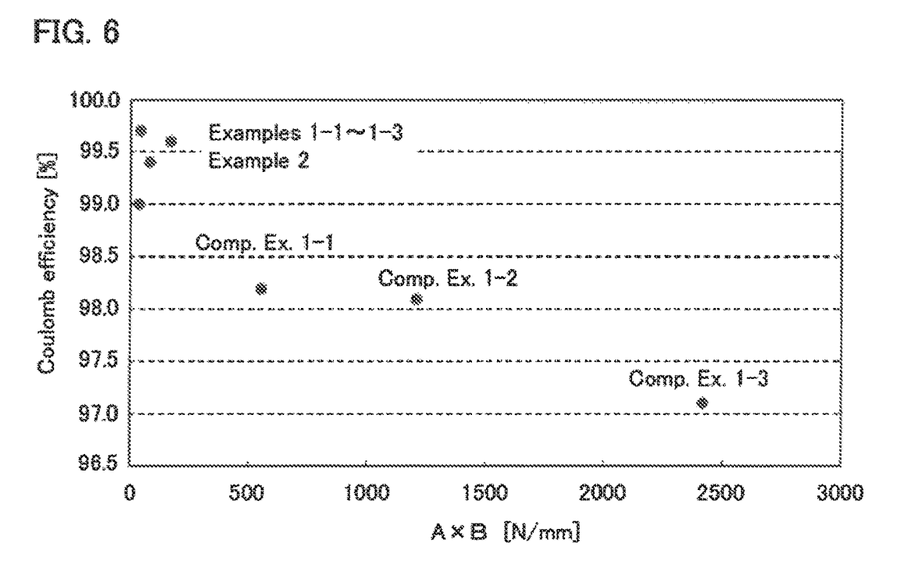
FIG. 6 is a graph showing the relation between the product of elastic modulus A and increase B, and coulomb efficiency.

Also, the relation between the product (A×B) of elastic modulus A and increase B, and coulomb efficiency is shown in FIG. 6. As shown in FIG. 6, a correlative relationship between A×B and the coulomb efficiency was observed, and it was confirmed that the coulomb efficiency increases by making A×B lower. That is, it was confirmed that, when elastic modulus A is relatively high, increase B is preferably controlled low, and when increase B is desired to be relatively high (when higher capacity is desired), elastic modulus A is preferably set low.

Also, compared to Example 1, the coulomb efficiency was low in Reference Example 1. The reason is presumed that the evaluation cell obtained in Reference Example 1 had a thick and hard SUS between the current collection part (Cu foil) and the elastic part (rubber).

<Measurement of Direct-Current Resistance>

A measurement of the direct-current resistance was conducted to the silicone rubber having electron conductivity (Silius from Fuso Rubber Sangyo Co., Ltd., thickness of 100 μm) used in Example 2, and the electron conductivity was measured. Specifically, the silicone rubber was held with a SUS pin, confined under 0.2 N·m to obtain a test piece. A pulse current of +100 μA was applied to the obtained test piece for 30 seconds, a pause for 10 seconds, a pulse current of −100 μA was applied for 30 seconds, a pause for 10 seconds, a pulse current of +200 μA was applied for 30 seconds, a pause for 10 seconds, a pulse current of −200 μA was applied for 30 seconds, a pause for 10 seconds, a pulse current of +400 μA was applied for 30 seconds, a pause for 10 seconds, a pulse current of −400 μA was applied for 30 seconds, a pause for 10 seconds, a pulse current of +1000 μA was applied for 30 seconds, a pause for 10 seconds, a pulse current of −1000 μA was applied for 30 seconds. Resistance R was determined from voltage V/current I. As the result, the electron conductivity of the silicone rubber was $6.9 \times 10^{-5}$ S/cm.

REFERENCE SIGNS LIST

10 . . . cathode
11 . . . cathode active material layer
12 . . . cathode current collector
20 . . . solid electrolyte layer
30 . . . anode
31 . . . anode active material layer
32 . . . cathode current collector
32a . . . current collection part
32b . . . elastic part
50 . . . power generation element
60 . . . exterior body
100 . . . all solid state battery
200 . . . all solid state battery system

What is claimed is:

1. An all solid state battery comprising:
a power generation element including a cathode, a solid electrolyte layer, and an anode, in this order, and
an exterior body storing the power generation element,
wherein the anode includes at least an anode current collector,
the anode current collector includes a current collection portion, and an elastic portion wherein the current collection portion is placed between the solid electrolyte layer and the elastic portion, and
an elastic modulus of the anode current collector is $2.14 \times 10^3$ N/mm$^2$ or more and $4.08 \times 10^3$ N/mm$^2$ or less.

2. The all solid state battery according to claim 1, wherein an anode active material layer is formed between the current collection portion and the solid electrolyte layer.

3. The all solid state battery according to claim 2, wherein the anode active material layer is a Li metal.

4. The all solid state battery according to claim 1, wherein the current collection portion and the solid electrolyte layer are in direct contact.

5. The all solid state battery according to claim 1, wherein the elastic portion has electron conductivity.

6. The all solid state battery according to claim 5, wherein an electron conductivity of the elastic portion is $1 \times 10^{-5}$ S/cm or more.

7. The all solid state battery according to claim 1, wherein a plurality of the power generation elements are stacked in a thickness direction, and a bipolar structure is formed.

8. The all solid state battery according to claim 1, wherein the current collection portion is Cu, and
the elastic portion is any one of a silicon rubber, a fluoro-rubber, an epichlorohydrin rubber, an acrylic rubber, an ethylene-acrylic rubber, a urethane rubber, a nitrile rubber, a hydrogenated nitrile rubber, a chloroprene rubber, an ethylene-propylene-diene rubber, an ethylene rubber, a propylene rubber, a butyl rubber, a butadiene rubber, a styrene-butadiene rubber, a natural rubber and an isoprene rubber.

9. The all solid state battery according to claim 8, wherein the elastic portion is the silicone rubber.

10. The all solid state battery according to claim 1, wherein the elastic portion does not have electron conductivity.

11. An all solid state battery system comprising:
the all solid state battery according to claim 1, and
a controlling unit controlling charge and discharge of the all solid state battery.

12. The all solid state battery system according to claim 11, wherein the controlling unit controls a thickness increase, due to charge, of an anode active material layer to be 5 μm or more and 50 μm or less.

13. The all solid state battery system according to claim 11, wherein, when an elastic modulus of the anode current collector is A [N/mm$^2$] and a thickness increase, due to charge, of an anode active material layer is B [mm], a value of A×B is 200 N/mm or less.

* * * * *